US008230248B2

(12) United States Patent
Dance et al.

(10) Patent No.: US 8,230,248 B2
(45) Date of Patent: Jul. 24, 2012

(54) PRINTER TIME-OUT

(75) Inventors: Christopher R. Dance, Grenoble (FR); Victor Ciriza, La Tour du Pin (FR); Laurent Donini, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 399 days.

(21) Appl. No.: 12/499,986

(22) Filed: Jul. 9, 2009

(65) Prior Publication Data

US 2011/0010571 A1 Jan. 13, 2011

(51) Int. Cl.
*G06F 1/32* (2006.01)
(52) U.S. Cl. .................. 713/323; 713/300; 713/320
(58) Field of Classification Search .............. 713/300, 713/320, 323, 324
See application file for complete search history.

(56) References Cited

U.S. PATENT DOCUMENTS

| | | | |
|---|---|---|---|
| 5,821,924 A | 10/1998 | Kikinis et al. | |
| 7,380,147 B1* | 5/2008 | Sun | 713/323 |
| 7,383,457 B1* | 6/2008 | Knight | 713/323 |
| 2001/0009018 A1 | 7/2001 | Iizuka | |
| 2003/0163747 A1 | 8/2003 | Yoshikawa | |
| 2006/0259803 A1 | 11/2006 | Edwards et al. | |
| 2007/0223028 A1* | 9/2007 | Boyes et al. | 358/1.14 |
| 2008/0109663 A1 | 5/2008 | Snyder et al. | |
| 2009/0300390 A1* | 12/2009 | Vojak et al. | 713/323 |

OTHER PUBLICATIONS

Ciriza, et al., *A Statistical Model for Optimizing Power Consumption of Printers*, Poster Presentation during a joint meeting of the Statistical Society of Canada & the Société Française de Statistique, in Ottawa Congress Centre, May 25-29, 2008.
Energy Star®, *Program Requirements for Imaging Equipment*, Version 1.0, downloaded Jun. 29, 2009.
Helmbold, et al., *Adaptive Disk Spin-Down Policies for Mobile Computers*, In Proc. 2nd USENIX Symp. on Mobile Networks and Applications, 5 (2000) 285-297.
Lu, et al., *Adaptive Hard Disk Power Management on Personal Computers*, IEEE Great Lakes Symposium on VLSI, pp. 50-53, 1999.
Market Transformation Programme, *BINCT17: Energy Star® Specification for Imaging Equipment*, Version 2.1, May 25, 2006, available at www.mtprog.com.
Network Working Group, *RFC1759—Printer MIB*, downloaded Jun. 29, 2009, available at http://www.faqs.org/rfcs/rfc1759.html.

* cited by examiner

*Primary Examiner* — Paul Yanchus, III
(74) *Attorney, Agent, or Firm* — Fay Sharpe LLP

(57) ABSTRACT

A system and a method of providing a time-out for a device, such as a printer are provided. The time-out determines when the device is shifted from a higher energy to a lower energy mode, absent the arrival of another job to be processed by the device. The method includes acquiring data comprising a set of inter-arrival times for at least one device over a period of time, such as a week and, for each of a set of candidate time-outs, deriving a probability from the data that an inter-arrival time from the set of inter-arrival times is greater than the candidate time-out. A cost function is computed, based on the derived probability and a robustness term which allows adversarial action not predicted by the histogram to be taken into account. A time-out for the at least one device can then be identified for which the cost function is a minimum.

27 Claims, 7 Drawing Sheets

PRINTER TIME-OUT

BACKGROUND

The present exemplary embodiment relates to device operation where the device can exist in a plurality of modes, each consuming a different amount of energy. It finds particular application in conjunction with the prediction of time-outs for devices, such as printers, and will be described with particular reference thereto.

Imaging devices, such as printers and copiers, operate at different power consumption levels. In an idle mode, the device is ready to use for printing or copying, which typically requires most power. When not in use, the device is cycled down to a power saving mode. These modes are sometimes known as standby modes, low power modes, or sleep modes. In the power saving mode, the device draws enough power to support certain functions of the device, but requires a warm up period before it is fully operation again. The warm up period is actuated, for example, when a print job is received for printing or a user selects a copying function or otherwise actuates the device. The device control system then activates components that draw additional power in preparation for use of the device. For example, a printer or copier may heat a fuser roll and cause the marking material to be readied for use. In the case of laser printers, this generally involves circulating the toner particles in a developer housing. For solid ink printers, the solid inks are heated to above their melting points.

Once the device has been used, it may remain in an idle mode at the higher power consumption level for some predetermined period of time (a time-out), to maintain one or more components within an operational temperature range or state. The time-out reduces the number of cycles experienced by the components, which helps preserve their operational life, and also reduces or eliminates waiting time for the customer. If the device is not in use again by the preset time-out, the device begins to cycle down to the power saving mode.

Currently, in most printers the inactivity period to wait before entering into sleep mode is either set by the administrator or predefined by the device manufacturer according to environmental standards as Energy Star. Until 2006, imaging equipment was evaluated as Energy Star compliant on the basis of having the manufacturer respecting the recommendations of time-outs defined by the EPA, which were dependant on the type of device (e.g., scanner, copiers, multi-function devices) and its speed capabilities. These time-outs were arbitrary and not self-adapted by any logic or intelligence embedded on devices in order to bring further power consumption improvements. Today, Energy Star criteria are based on the evaluation of power consumption during a fixed period of a week in which the imaging equipment receives requests with a predefined standard usage pattern. The result of the evaluation method is the Typical Energy Consumption (TEC) value measured in kWh and which must be under a certain level in order to obtain the Energy Star certification. For example, for a color multi-function device producing under 32 images per minute, its power consumption must be below (0.2 kWh*ipm)*+5 kWh. Although the current evaluation method takes into account a usage pattern, it does not take into account the stochastic nature of usage patterns.

In order to respect TEC maximum levels, manufacturers configure printer time-out strategies reducing the time-out values and making improvements in the energy consumption of print engines. However, time-out values are still static values which, in most cases, are not adapted to the real usage of devices.

Methods for determining a time-out can be summarized as follows: if a device stays in idle mode during a predefined time s then it will enter into sleep mode and stay in this mode until the next incoming request. To find s, several strategies have been proposed. Lu and Micheli adjust s according to the unavailability time of the device due to the fact of switching from sleep to an active status (Y. Lu and G. De Micheli. Adaptive hard disk power management on personal computers. IEEE Great Lakes Symposium on VLSI, pages 50-53, 1999). Douglis, et al. set s according to the relation between the idle period and the wakeup delay (time to get out of sleep mode). If this relation is small, s increases and s decreases otherwise. (F. Douglis, P. Krishnan, and B. Bershad. Adaptive disk spin-down policies for mobile computers. In Proc. 2nd USENIX Symp. on Mobile and Location-Independent Computing, 1995).

Parametric approaches for determining s try to fit user behavior and more in particularly the inter-arrival time between two subsequent jobs or print requests distribution to a parametric model and extract the parameters which best fit the model. Such approaches can yield inaccuracies due to the difficulty in fitting parameters to distributions, such as Weibull or Normal distributions to real usage behavior.

Therefore a method for inferring a time-out is desired which avoids these problems.

Incorporation by Reference

The following reference, the disclosure of which is incorporated herein in its entirety by reference, is mentioned.

U.S. Pub. No. 20080109663, published May 8, 2008, entitled SYSTEM AND METHOD FOR REDUCING POWER CONSUMPTION IN A DEVICE, by Snyder, et al., discloses a system and process for enabling a device to adjust the duration of various power modes based on usage of the device. The process includes operating the device at a fully operational power level, counting a first wait time, modifying a first wait time modifier in response to detection of image generating device use prior to expiration of the first wait time, and reducing power consumption from the fully operational level to a low power level in response to expiration of the first wait time.

Brief Description

In accordance with one aspect of the exemplary embodiment, a method of computing a time-out for a device includes acquiring data comprising a set of inter-arrival times for at least one device. This set of inter-arrival times values can be examined as the set of candidate time-outs. For each of a set of candidate time-outs, the method includes deriving a probability that an inter-arrival time from the set of inter-arrival times is greater than the candidate time-out. A cost function is computed, e.g., with a computer processor, based on the derived probability and a robustness term and a time-out identified for the at least one device as the one minimizing the cost function value.

In another aspect, a computer implemented system for computing a time-out for a device includes data memory which stores acquired data comprising a set of inter-arrival times for at least one device, main memory which stores instructions which, for each of a set of candidate time-outs, derive a probability that an inter-arrival time from the set of inter-arrival times is greater than the candidate time-out, compute a cost function based on the derived probability and a robustness term, and identify a time-out for the at least one device for which the cost function is a minimum, and a processor in communication with the main memory which executes the instructions for processing the acquired data.

In accordance with another aspect, a printing system includes a plurality of networked printers which each acquire inter-arrival data for print jobs. A time-out system receives the inter-arrival data from the printers, generates at least one histogram therefrom for a set of candidate time-outs, and computes a time-out for the plurality of printers by minimizing a cost function, the cost function including a robustness term which factors in adversarial behavior not included in the histogram.

DETAILED DESCRIPTION

Figure 1:
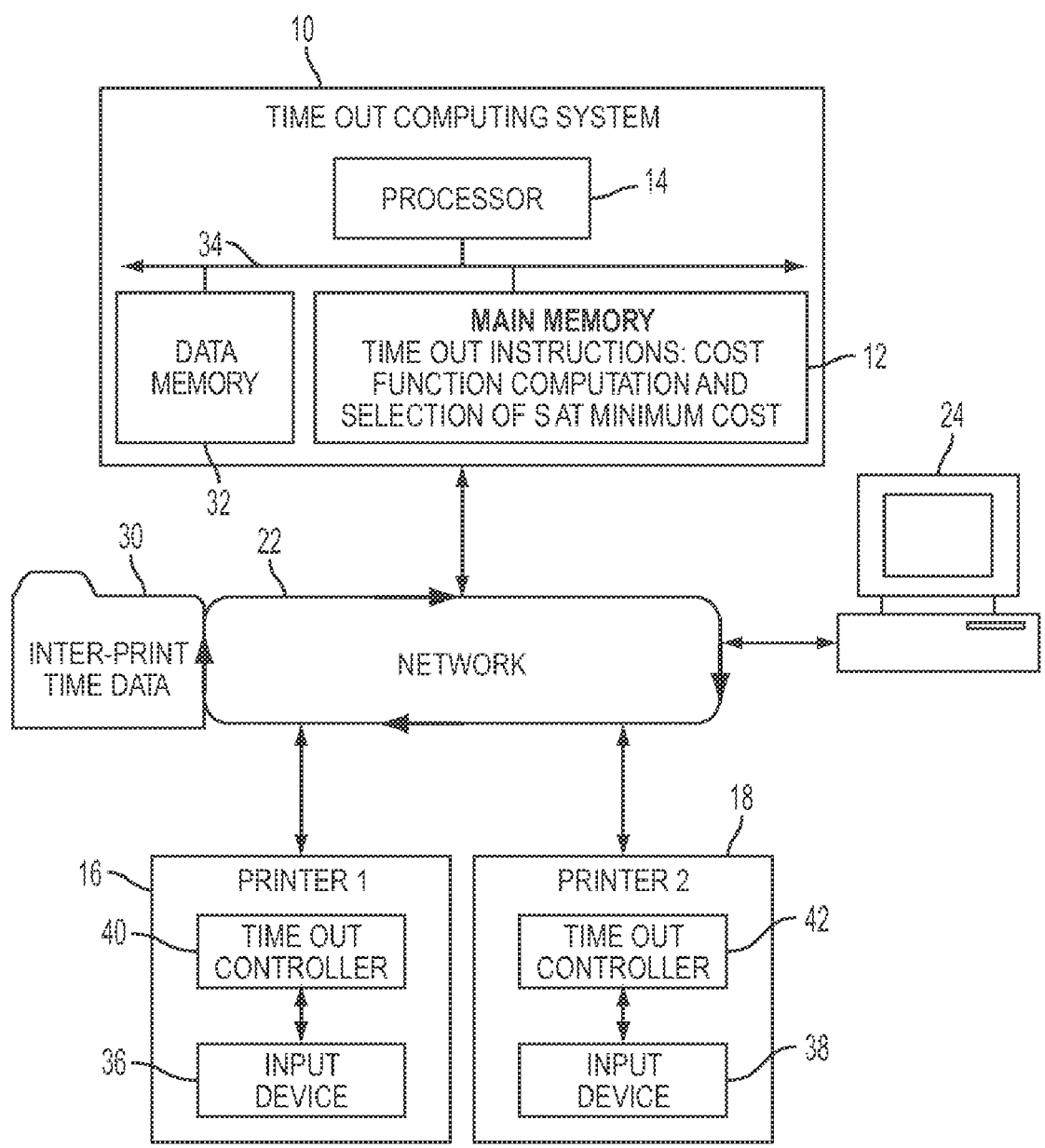
FIG. 1 is a functional block diagram of an environment in which a system for computing a time-out for one or more devices, such as printers, operates in accordance with one aspect of the exemplary embodiment.

The exemplary embodiment provides a system and method for setting a time-out s to reduce, e.g., minimize the expected power consumption of a device, such as a printer, by putting it in sleep mode after the time-out s is reached. In a network of printers, since different printers see different user activities, this time-out can be adaptive.

The time-out s can be considered as the time period that a device will wait after completing a job request (e.g., a print request) before transitioning between a first mode (generally referred to as an idle mode) and second mode in which power consumption is less than in first mode (generally referred to as a sleep mode), in the absence of arrival of additional job requests, such as print requests. For convenience, the device can be assumed to be in the idle mode as soon as a job has been processed. In the idle mode, the device is ready to perform another job. In the sleep mode, the device is not immediately ready for processing another job but requires a warm up period in which one or more components are brought to a fully operational state. While in the exemplary embodiment, the device is described in terms of a printer and the jobs to be processed are therefore print jobs, it is to be appreciated that other devices are also contemplated, such as laptop or desktop computers, video monitors, and the like.

As used herein, a printer can be a printer, copier, or a multifunction device. In general, in executing a print job, the printer applies images to print media, such as paper, using marking materials, such as inks or toners. Exemplary printers include xerographic, inkjet, and thermal printers, although any type of printer may be considered. A "print job" or "document" is normally a set of related sheets, usually one or more collated copy sets, copied from a set of original print job sheets or electronic document page images, from a particular user, or otherwise related.

The exemplary system and method rely on acquiring historical data from one or more printers concerning inter-arrival times, and in the case of print jobs, inter-print times of print jobs. The inter-arrival time X is the time between completion of a first job and the arrival of the next subsequent job to be processed. Thus, X is 0 when a second job is printed immediately after a first job is completed.

Inter-arrival times can be acquired in different ways. In one method, the inter-arrival data is obtained directly from the device. Alternatively, it may be derived from job tracking data stored and available for retrieval on imaging devices. Or, the data may be obtained from print servers or client workstations on which software monitoring the print activity is present (e.g., Xerox Job Tracking Agent). In the latter case, the inter-arrival data can be inferred simply if the time between completion of a first job and the arrival of the next subsequent job to be processed is available. However, is to be noted that most job tracking or monitoring systems do not track completion time, which means that the system will need to estimate the completion time by using the device's speed characteristics to infer the completion time.

One problem with determining a time-out s is that devices, such as printers, do not experience consistent usage throughout the day. Consider a device that prints a report every 2 minutes for 8 hours per day and sleeps at night. The probability density P(X) of inter-print times X is thus given by:

$$P(X)=239/240\ \delta(X-2)+1/240\ \delta(X-960)$$

where each $\delta$ represents a Dirac delta function (i.e., takes a value of 0 at all values except where the bracketed term=0) and X is measured in minutes.

If the time-out s were to be selected parametrically, e.g., by fitting a conventional Weibull distribution to this expression, the time-out predicted is 0 minutes. This corresponds to a loss of over 50% of energy consumption relative to the optimum time-out for a device consuming 12 kJ per wakeup, 80 W while idle, and 16 W while sleeping. The loss is the same if a Markov model is employed. The true optimum time-out is just over 2 minutes.

In accordance with the exemplary method, a non-parametric model is used for computing an optimum time-out. In the exemplary method, a value of s is obtained by computing an expected cost function for operating the device over a set of candidate time-outs and selecting a value of s based on the minimum cost. The system proposes a time-out which is robust to changes in user behavior and in which s is also adaptive to behavior.

With reference to FIG. 1, an exemplary environment in which an automated time-out computing system 10 operates is shown by way of example. The system 10 determines a time-out s for a device by minimizing a cost function which takes into account historical data for inter-arrival times and a robustness term for accommodating behavior which does not fit the historical data, as described in greater detail below.

The system 10 may be embodied in hardware, software, or a combination thereof. In the exemplary embodiment, the system 10 includes main memory 12 and a processor 14 in communication therewith. Main memory 12 stores instructions for computing a time-out s for one or more devices 16, 18, here shown as printers, and which are executed by processor 14. The system 10 may be resident, for example, on a server which is linked to the printers 16, 18, by a network 22. Alternatively, each printer 16, 18 may have its own resident time-out computing system (e.g., in its digital front end) or the time-out computing system 10 may be located elsewhere on the network, for example, on a workstation 24, which may be linked to the printer(s) 16, 18 via the network 22. In yet other embodiments, the system 10 may be remote from the network, e.g., accessed via the internet. In another embodiment, where the time-out system 10 is an independent device, computed time-outs may be manually set for each of the printers based on the output of the time-out computing system 10. The action of setting remotely the time-out over a network can be achieved by using standard protocols, such as SNMP or Web Services for Devices which are already available in order to perform remote device management. (See, e.g., RFC 1759—Printer MIB, at http://www.faqs.org/rfcs/rfc1759.html).

The network printing system illustrated in FIG. 1 executes print jobs. Specifically, print jobs comprising one or more documents to be printed are generated at workstations, such as workstation 24, or at the printer 16, 18 in the case of a copy job. The print jobs are routed to the selected printer for printing the job and printed by the selected printer in the printer's normal course, such as a first-in-first-out (FIFO) printing schedule. The jobs arrive at the printer for printing at variable times. For example, some print jobs may arrive at intervals of 1-2 minutes, while others may be many minutes or even hours apart.

The time-out computing system 10 receives inter-arrival data 30 from each of the printer(s) 16, 18. The inter-arrival data may be a set of actual inter-print times or arrival/print time data from which a set of inter-arrival times can be computed. Additional information may also be acquired, such as the time of day, day of the week, ID of the person submitting the print job, and the like. The data 30 may be received for a fixed period of time, such as a day, week, month, etc., or the system 10 may receive such data continuously or semi-continuously. The data 30 may be received by the system 10 via the network 22, or in the case of an independent system, input by disk, manually, or otherwise. The data 30 may be stored in data memory 32 during processing, which may be combined with main memory 12 or be separate therefrom. Components 12, 14, 32 of the time-out computing system 10 may communicate via a data/control bus 34.

Based on the inter-arrival times for a fixed period, such as a week, as well as stored cost information and a robustness term, the time-out computing system 10 computes an optimum time-out s for one or both of the printers 16,18. The cost information may include, for example, the respective costs of maintaining the printer in idle mode and sleep mode, the cost of waking the printer up from the sleep mode to the idle mode and returning it to the sleep mode, and the annoyance cost associated with a user having to wait for the printer to be woken up. These costs may be the same for each network printer, or may be different. The time-out computing system 10 may output the time-out s to the printer, e.g., via the network 22. Alternatively, the time-out may be manually set by an operator, e.g., using a user input device 36, 38, such as a keyboard, touch screen, or the like.

Each printer 16, 18 includes a respective time-out controller 40, 42 which adopts the time-out value s as its new time-out and operates the respective printer in accordance with the new time-out. In the case of a xerographic printer, a photoreceptor in the form of a belt or drum is charged to a uniform potential, selectively discharged to create a latent image, and then the latent image is developed by applying toner particles of a selected color or colors from a developer housing. The toner image thus formed is transferred to the print media and fused thereto with a fuser using heat and/or pressure. In the exemplary embodiment, the fuser and developer housing are under the control of the time out controller 40, 42 and cycle between first and second modes in accordance with instructions therefrom.

Figure 2:
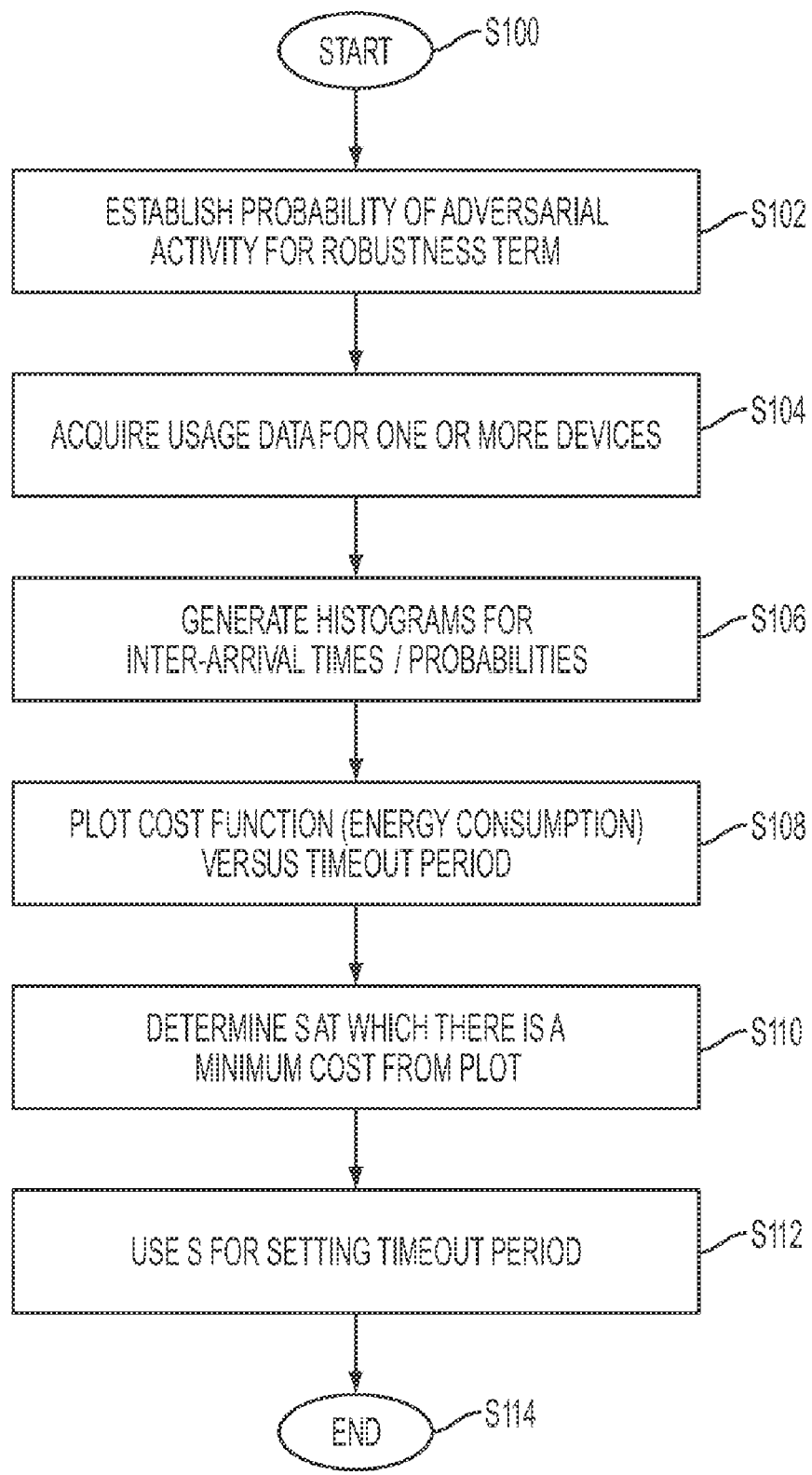
FIG. 2 is a flow chart of an exemplary method for computing a time-out for one or more devices in accordance with another aspect of the exemplary embodiment.

With reference now to FIG. 2 a method for computing a time-out s for a device, such as a printer, is shown. The method may be performed in the environment of FIG. 1. The method begins at S100.

At S102, a value r for accounting for the probability of adversarial activity is selected. The probability r may be from about 0.001-0.1 on a scale of 0-1. For example, r may be about 0.005. This means that an adversary can influence the behavior up to about 0.5% of the time without pathologically affecting the time-out. This value may be generated from data acquired over a long time period, such as about one year, over one or multiple printers. All printers in the network may be assigned the same value of r, or may be assigned different values.

The probability of adversarial activity is designed to account for unexpected print events rather than accounting for real adversarial or pathological behavior of users. It is to be appreciated that user print usage behavior is, by itself non pathological, and may be solely due to workload and requirements. The adversarial activity thus takes into account that a user may start using printers at unexpected rates or at hours of the day in which devices are normally unused.

At S104, a set of print job inter-arrival times is acquired over a selected time period. The times may be acquired over any convenient time period, for example, over a week or a month.

Figure 3:
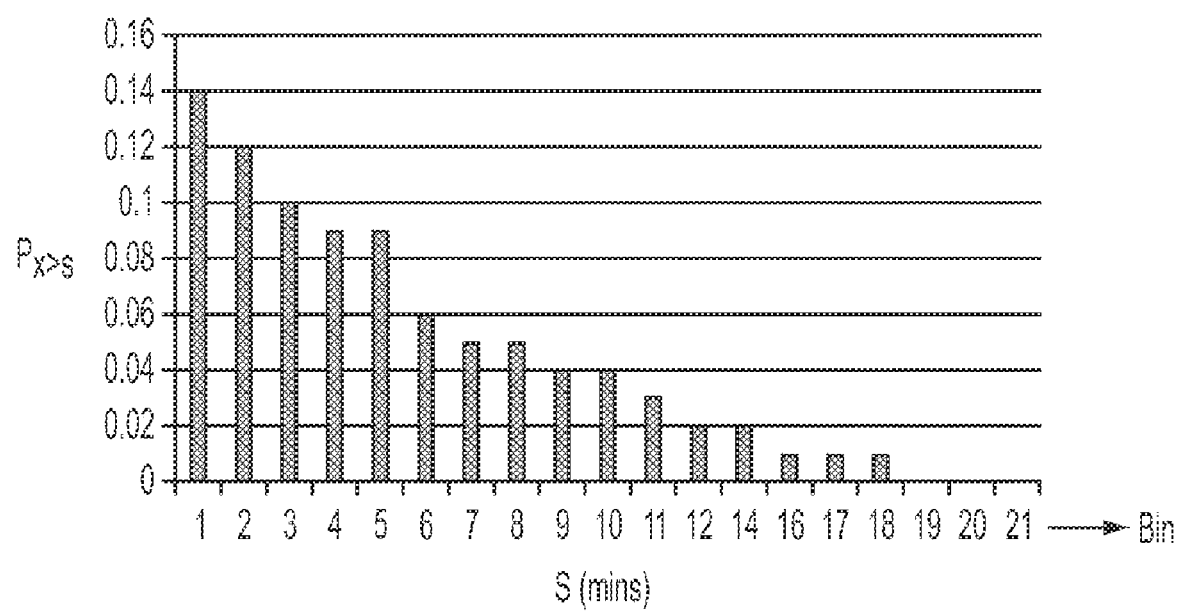
FIG. 3 illustrates an exemplary histogram which may be derived from the inter-arrival times in minutes data from one or more devices.

At S106 a model, such as a histogram, is generated, based on the arrival time data. For example, FIG. 3 shows an exemplary histogram which could be generated using the inter-arrival times X, in which the probability $P_{X>s}$ of X being greater than s is plotted for a set of candidate values of s (e.g., in minutes varying between about 1 minute and 30 minutes). As will be appreciated, there may be fewer or more candidate values of s than those shown. By way of example if there are 1000 print jobs in 1 week and 40 of those have an inter-arrival time X of 10 minutes or greater, then the $P_{X>s}$ is 40/1000=0.04 when s=10.

Figure 4:
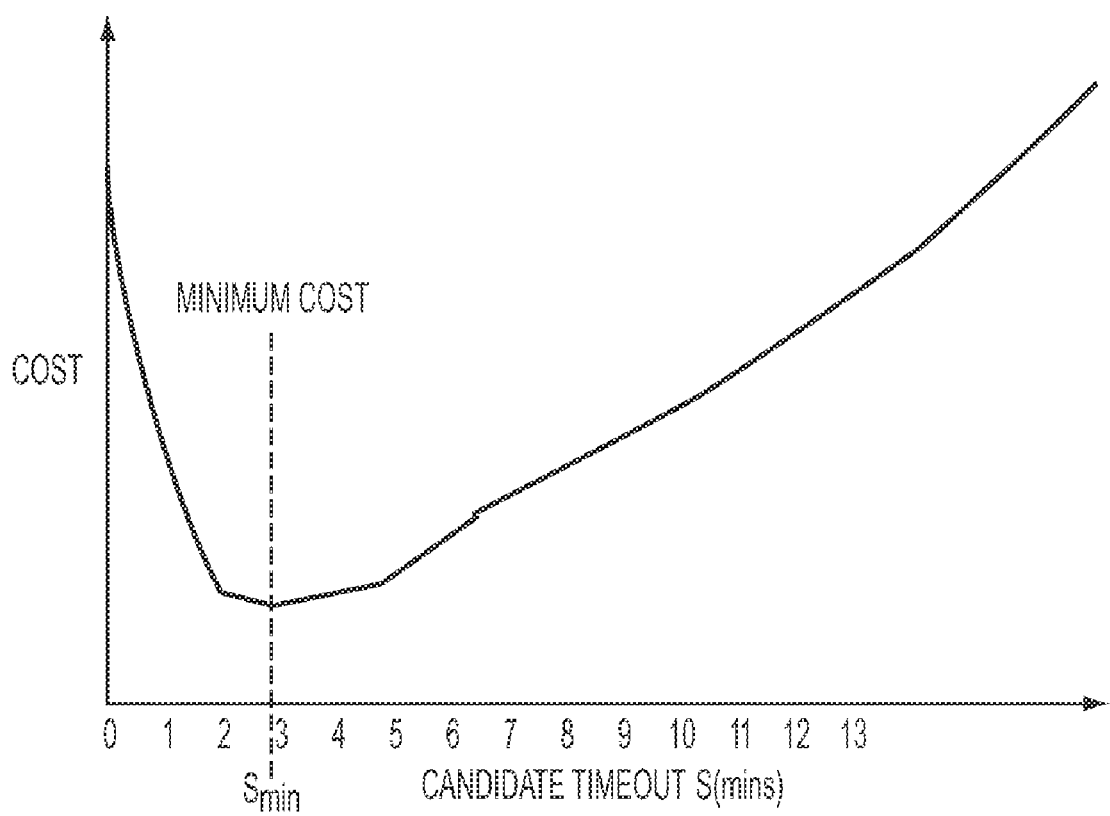
FIG. 4 illustrates a plot of a cost function derived from the histogram of FIG. 3, showing the time-out at minimum cost ($s_{min}$)

At S108, on the basis of the model, and the device's power consumption operating characteristics, a cost function is computed. The exemplary cost function has two (or more) terms: a first term which provides the cost of a particular time-out as a function, assuming that behavior fits the model. A second term is the costs of time-outs given an adversary, weighted by the probability of adversarial behavior. For example, the expected costs for each of the set of time out periods are computed, e.g., in terms of energy consumed, and may be plotted. The costs can be normalized and any fixed costs, such as printing costs, can be ignored. For example, as illustrated in FIG. 4, the energy cost (e.g., in joules), computed over the test period (e.g., 1 week) for a selected value of s can be divided by the same costs incurred by setting a standard time-out of, for example, 30 minutes.

As will be further described below, the first term of the cost function accounts for such costs as the cost of maintaining the printer in an idle mode, the cost of maintaining the printer in a sleep mode, which is typically less than the idle mode cost, the cost of waking the printer up to the idle mode. Additionally, the annoyance cost corresponding to a user having to wait for the printer to warm up, if it has been put into sleep mode, is also factored in. While not really an energy cost, there have been studies which put a value on the user's waiting/per unit time and such values can be used here. Of course, in a facility which places a high value on not waiting to have a print job printed, for example, because the users are highly compensated or because the facility is penalized financially if a customer has to wait too long for a print job, the annoyance costs may be weighted accordingly and/or increase exponentially with the time required by every device to transition from sleep mode to ready mode. Alternatively, the costs may be weighted, depending on the cumulative time that all the device users may have expended due to sleep mode to ready mode transitions in the last week or during some other suitable timeframe.

At S110, the time-out at minimum cost ($s_{min}$) is determined from the plot.

At S112, a time-out s for the printer is set based on the time out period at minimum cost. For example, the computed time-out $s_{min}$ may be rounded up to the nearest number of minutes, or the like to generate s. All printers on the network may have the same set time-out. Or, each printer may be assigned its own time-out.

The method ends at S114.

As will be appreciated, the time-out(s) s may be recomputed, at intervals, using new data. For example, steps S104-S112 are repeated at weekly or monthly intervals or other suitable time interval. This allows the computed time-out to account for behavior changes, e.g., due to vacations or changes in behavior due to the relocation of the device itself.

Figure 5:
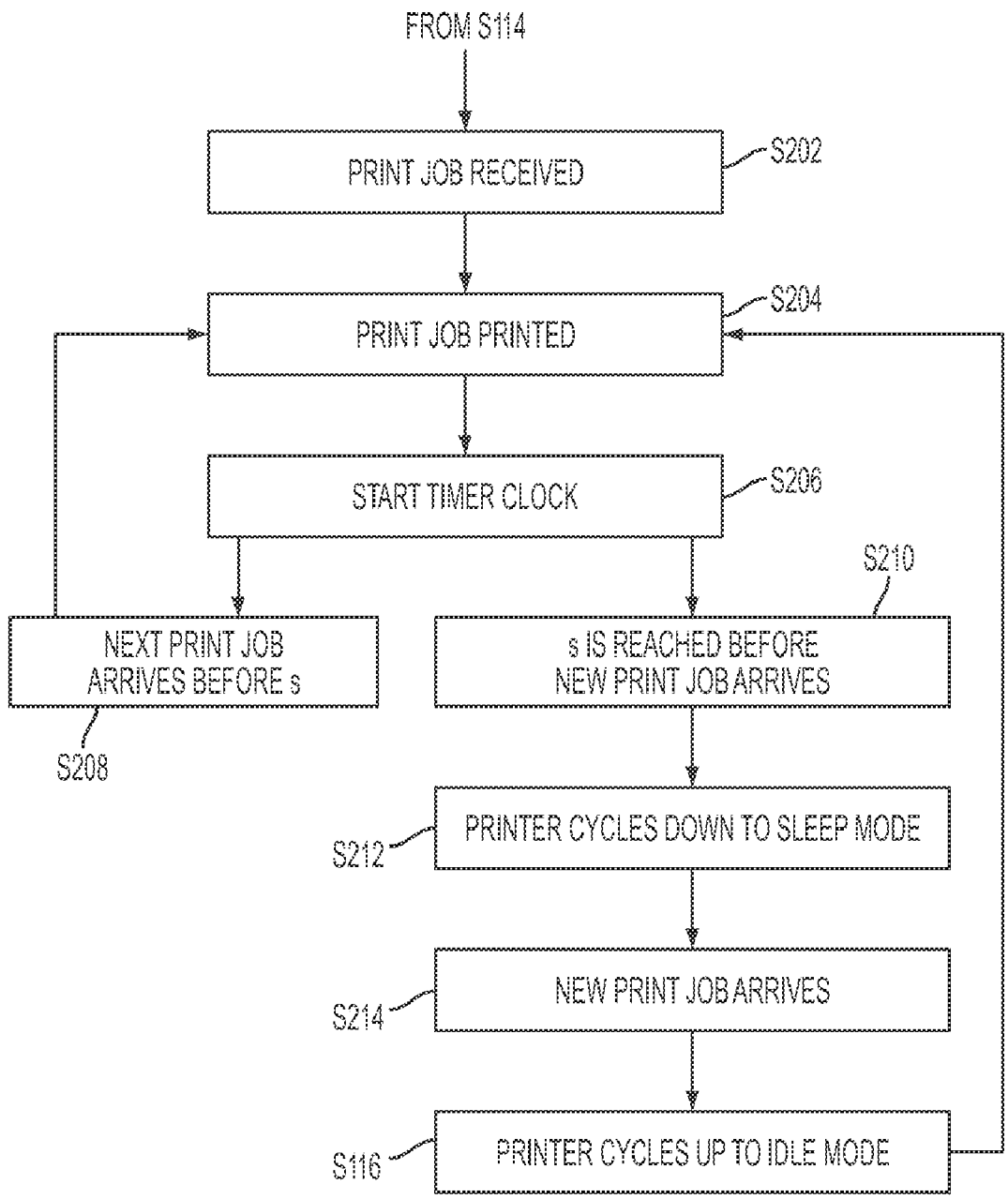
FIG. 5 is a flow chart illustrating steps in the method of operating a printer once a time-out has been established by the method of FIG. 2.
Figure 6:
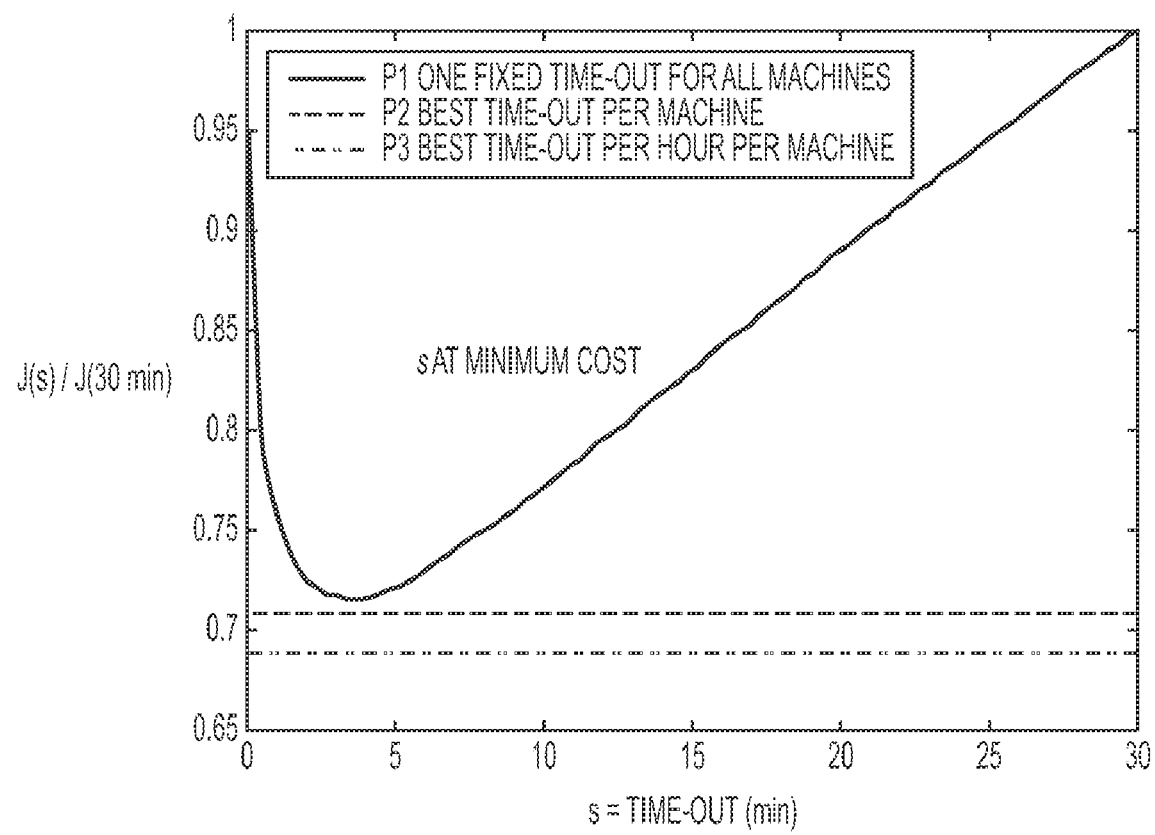
FIG. 6 illustrates a plot comparing the costs of applying various time-out policies relative to that of a standard 30 minute time-out, for three policies using the exemplary time-out computation method, a first policy P1 in which the time-out is fixed for all 15 machines, a second policy P2 in which each machine operates with its own time-out; and a third policy P3 in which the acquired data is segmented by hour of the day and the time-out is computed for each printer for each hour of the day.

Once the time-out s is set, the printer operates as illustrated in FIG. 5. At time $t_0$, a first job arrives (S202) and at $t_1$ is printed (S204). At $t_1$, the printer starts a timer clock (S206). If another job is received between $t_1$ and $t_2$ (S206), the arrival time of this job becomes $t_0$, the method returns to S204, and at $t_1$, the new job is printed.

If, on the other hand, at $t_2$, no further job has arrived (S210), the time-out is reached ($t_2-t_1=s$) and the printer is cycled down to its sleep mode (S212). In the case of a xerographic printer, this may include switching off power to the fuser so that the fuser temperature drops to a lower temperature than that which is normally used for fusing, and halting the motor which causes the toner to be continuously mixed with the carrier granules in the developer housing. When a new job arrives (or automatically, after a set period, such as 30 minutes) (S214), the printer 16, 18 is cycled up to the idle mode (S116) and the method returns to S204, where printing of the new job is performed. The method can continue in this way, with data about the inter-print times being sent to the system 10, for a selected period of time, after which a new value of s is computed.

The method illustrated in FIG. 2 may be implemented in a computer program product that may be executed on a computer. The computer program product may be a tangible computer-readable recording medium on which a control program is recorded, such as a disk, hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. In other embodiments, the method may be implemented as a transmittable carrier wave in which the control program is embodied as a data signal. Suitable transmission media include acoustic or light waves, such as those generated during radio wave and infrared data communications, and the like. The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for computing a time-out.

Further details of the exemplary system and method will now be described.

Expected Cost

The expected cost will depend of the inter-arrival time X between two successive print jobs.

Let {event} denote the indicator function for 'event'. Let the expected cost $E_{cost}$ of an inter-print cycle of random length X and time-out s be given by a cost function having two terms as follows, the first term covering the situations where X>s and the second term covering the situations where X≦s:

$$E_{cost}=P_{X>s}*(IC*s+SD+WU+(E[X|X>s]-s)*SC)+IC*P_{X<s}*E[X|X<s]+E_{PC}$$

where $P_{X>s}$ is the probability that X is greater than s,
IC is the cost per unit time of the printer being in idle mode;
SC is the cost per unit time of being in the sleep mode;
SD is the cost associated with shutting down the device, i.e., from idle mode to sleep mode (which may be assumed to be an instantaneous operation);
WU is the cost associated with waking up the device, i.e., from sleep mode to idle mode (which may be assumed to be an instantaneous operation);
$E_{PC}$ is the expected print cost.

Since: $P_{X<s}*E[X|X<s]=E[X*I\{X\leq s\}]$ (This is a basic property of mathematical expectations—see, e.g.,: http://is-faserveur.univ-lyon1.fr/~stephane.loisel/prerequis_esp_cond.pdf), then $$E_{cost}=P_{X>s}*(IC*s+SD+WU+(E[X|X>s]-s)*SC)+IC*E[X*I\{X\leq s\}]+E_{PC}$$

where $E[X*I\{X\leq s\}]$ is the mean inter-arrival time when the inter-arrival time is less than s (specifically, the mean of the inter-arrival time times the indicator that the inter-arrival time is less than s).

The print cost $E_{PC}$ can be assumed to be a constant (independent of s). The shutdown and wakeup costs always occur together. Other terms are proportional to the idle cost. Therefore, if:

$$w=\frac{(SD+WU)}{(IC-SC)}$$

then it can be shown that the expected cost $E_{COST}$ is proportional to $P_{X>s}(s+w)+E[X*I\{X\leq s\}]$, up to a constant. Specifically:

$$E_{cost}=(IC-SC)*\left(P_{X>s}*\left(\frac{IC}{IC-SC}*s+w+(E[X|X>s]-s)*\frac{SC}{IC-SC}\right)\right)+IC*E[X*I\{X\leq s\}]+E_{PC}$$

and since:

$$E[X|X>s]=\frac{E[X*I\{X>s\}]}{P_{X>s}},$$

then:

-continued $$E_{cost} = (IC - SC) * \left(P_{X>s} * \left(\frac{IC}{IC - SC} * s + w - s * \frac{SC}{IC - SC}\right)\right) +$$
$$SC * E[X * I\{X > s\}] + IC * E[X * I\{X \leq s\}] + E_{PC}$$

and:

$E_{cost} = (IC-Sc)*(P_{X>s}*(s+w))+SC*E[X*I\{X>s\}]+IC*E[X*I\{X\leq s\}]+E_{PC}$ Further, since:

$E[X*I\{X>s\}]=E[X]-E[X*I\{X\leq s\}]$ then:
$E_{cost}=(IC-SC)*(P_{X>s}*(s+w))+SC*(E[X]-E[X*I\{X\leq s\}])+IC*E[X*I\{X\leq s\}]+E_{PC}$ $E_{cost}=(IC-SC)*(P_{X>s}*(s+w))+SC*E[X]+(IC-SC)*E[X*I\{X\leq s\}]+E_{PC}$ $E_{cost}=(IC-SC)*(P_{X>s}*(s+w)+E[X*I\{X\leq s\}])+SC*E[X]+E_{PC}$ Since $E_{PC}$ is a fixed cost and $E[X]$ does not depend on s, then $E_{cost}$ is proportional to $P_{X>s}(s+w)+E[X*I\{X\leq s\}]$, up to a constant. The value of w can be selected to meet Energy Star's model for users being annoyed by a short time-out implying more chances of having users impacted by printers coming out from sleep mode. In this case, w is approximately 15 minutes.

Robustness Term

To allow for an adversary, a robustness term is introduced into the cost function, based on the reasonable assumption that reality is non-stationary. For example, rather than printing 4 or 5 documents a day for five out of seven days and nothing on days 6 and 7, a particular user may unexpectedly print a large number of documents on the 6$^{th}$ day. There will thus be unmodeled variations in $P_{X\leq s}$. It is desirable to make the system 10 robust to such variations. For example, allow $P_{X\leq s}$ to vary from its modeled value to some other cumulative distribution F(s) in any way that reality decides for some fraction q of the time, then optimizing the robust cost function J can be computed as follows:

$\min\_s \max\_F J[s, F]=(P_{X>s}(s+w)+E[X*I\{X\leq s\}])+r((1-F(s))(s+w)+E[X*I\{X\leq s\}]/F])(E[X]/s)$ where r=q/(1-q).

The min_smax_F is an optimization of the robust cost function. The last factor, E[X]/s compensates for the fact that for shorter time-outs, an adversary can repeat a time-out/wake up cycle more frequently, relative to the typical expected cycle duration.

Now given any value of s, F(s), the maximum value of $E[X*I\{X\leq s\}|F]$ is clearly obtained when F(u)=0 for u<s. This maximum value is s*F(s). Similarly given any value of s, F(s), the maximum value of (1−F(s)) (s+w) is a constant. Since w>0, F(s)≧0, the maximum over F is thus:

$\max\_F J[s, F]=(P_{X>s}(s+w)+E[X*I\{X\leq s\}])+r(1+w/s)E[X]$.

Again r E[X] is a constant with respect to s. So the task is simply to minimize the cost function:

$K(s)=(P_{X>s}(s+w)+E[X*I\{X\leq s\}])+r \, wE[X]/s$.

(Since J depends on s and F and it has been shown that the cost does not depend on F, a cost function K that does not depend on F can be written).

Clearly E[X] can be rather large if not many jobs are submitted. In practice, the system may require that s may be at most, 30 minutes. Hence for a device where there have always been long intervals between jobs, the optimum time-out setting will be about 30 minutes.

Thus, in the exemplary method outlined above, step S106 may thus include obtaining histograms of $P_{X>s}$ and hence E[X|X≦s], E[X] by sampling over some period, such as 1 week.

In step S108, to select a time-out, compute K(s) for each bin of the histogram. For the cost computation, a suitable value of r=0.005. At S110, select that s giving the minimum value (e.g., cost or energy).

As will be appreciated, various modifications can be made to the method described. For example, each of a set of printers can have its own time-out, computed from its own historical data, or several printers can pool data and used the same computed time-out. The time-out can vary over the course of a day or week by segmenting the inter-arrival data according to time of day/week.

Without intending to limit the scope of the exemplary embodiment, the following example demonstrates applications of the method.

EXAMPLE

Data from 15 printers in a facility was obtained for a one year time period. The devices printed between 1 and 58,000 times with a mean of 3874 prints per device. The total non-printing energy consumption J for any given policy over all devices was measured relative to using a fixed time-out of 30 minutes for all devices $J_{(30 \, min)}$. FIG. 5 shows these relative costs for policies chosen with hindsight:

The first policy (P1) uses a fixed time-out equal to the value on the X-axis.

The second policy (P2) uses the optimal fixed time-out per machine over the whole year.

The third policy (P3) discretizes the time of day into 24 bins and selects the optimal time-out per machine for this time of day over the whole year.

The policies save between 28% and 31%. Policy 1, the computationally simplest of the three, was still very effective. Given that even in an environment which shows a very clear dependence on time of day, there is really very little additional energy saving between the second and third policies, while having to model time of day would add an order of magnitude to the overall complexity, it is reasonable to ignore time of day data.

When hindsight is not available, then P(X≦s) can be predicted using data from some period T (e.g. the previous week) for each device. If less than some threshold N of samples were available for the given week, the time-out was set to the previous week's value. If there was no previous week's value, the time-out w=15 minutes was used. TABLE 1 shows the relative costs $J/J_{(30 \, min)}$ using the predicted time-outs for different robustness factors r as well as the ten percentile of the time-out over all periods and devices. It shows that the behavior is quite insensitive to T and N. However a non-zero value of r prevents short time-outs, hence makes the system more robust to any behavior changes. For instance, were there to be a sudden flurry of jobs at 1 minute intervals, the non-robust policy with a time-out of 0.26 minutes would put the printer to sleep after each of them, wasting a vast amount of energy, yet the robust policy loses nothing extra in the average case.

TABLE 1

| T (days) | N | r | $J/J_{(30\ min)}$ | 10% of s (min) |
|---|---|---|---|---|
| 7 | 100 | 0.000 | 0.7511 | 1.579 |
| 7 | 10 | 0.000 | 0.7283 | 0.263 |
| 7 | 10 | 0.005 | 0.7281 | 3.940 |
| 28 | 10 | 0.000 | 0.7235 | 0.526 |

Figure 7:
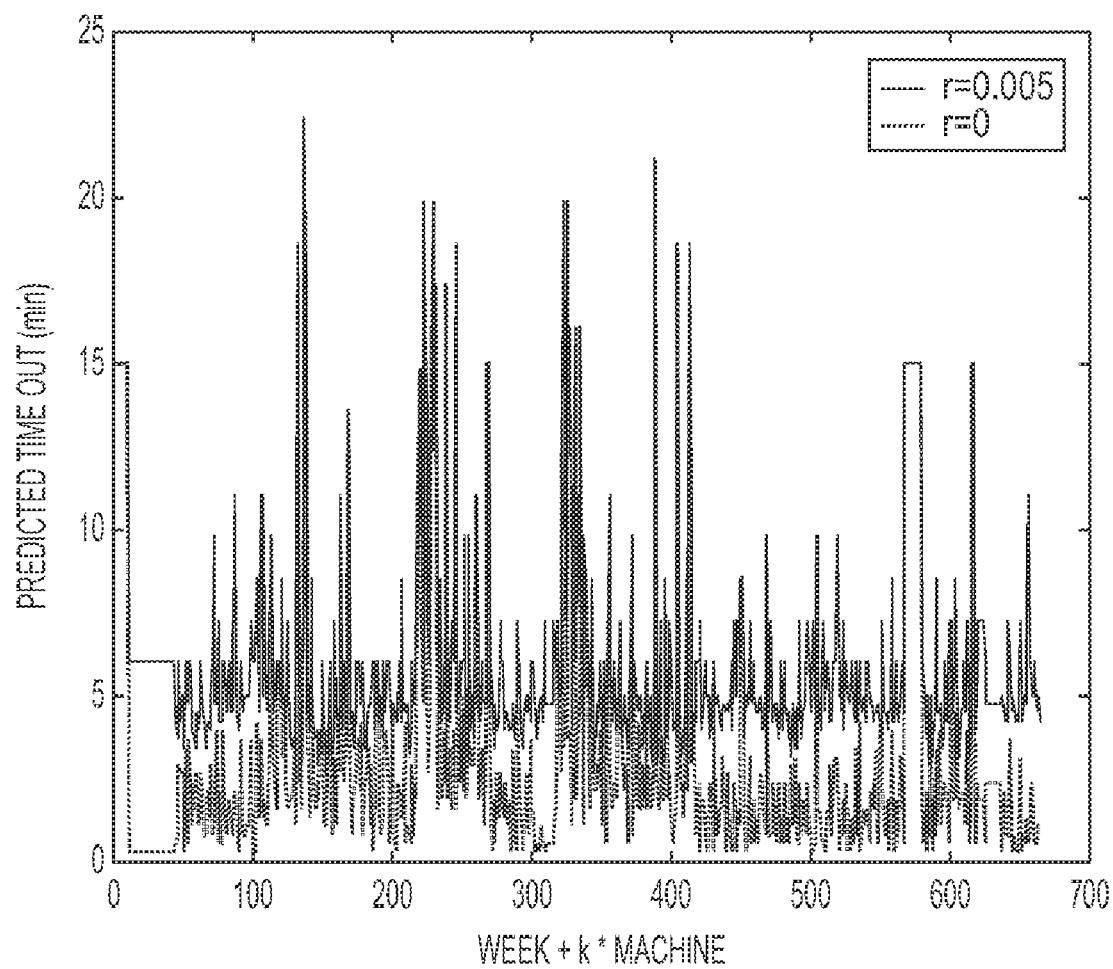
FIG. 7 illustrates predicted time-outs for a set of 15 printers both with and without incorporation of a robustness term.

FIG. 7 shows the predicted time-out values over the 52 week period with r=0.05 and r=0, using the 1 week sampling interval T for all 15 machines in the data set concatenated together. Note that the x-axis does not go to 15×52 since not all weeks have any samples to predict.

The plots illustrate how the robustness factor increases the minimum time-outs. Since each predicted time-out is the optimal value for the previous week, it can be seen that the optimal time-outs are rather volatile. If an analysis of the dependence between successive optimal time-outs is performed, it can be seen that they are rather independent, except for one effect: inter-print intervals of <1 minute are followed by inter-print intervals of <1 minute with a probability about 4% higher than would be predicted by an independence assumption; and intervals of >30 minutes are followed by intervals of >30 minutes with probability about 3% higher than predicted by an independence assumption. However since optimal time-outs are generally larger than 1 minute and less than 30 minutes, this effect is not helpful for improving results. From these results, it would appear that using a large time-window T should be advantageous in terms of cost. However, since the method needs to be robust to changes in user behaviour without needing to introduce change-point detection (for instance with Page-Hinkley statistics) a value of T=1 week provides a reasonable compromise.

In summary, a system and method have been described which utilize a histogram of inter-print times to derive a time-out cost function that includes a robustness term, from which a time-out value can be derived which minimizes the cost function.

An advantage of the exemplary system and method is that it provides non-pathological behavior of the time-out mechanism given arbitrary user activity, yet good behavior given typical user activity.

Another advantage is that it allows efficient implementation without having to solve non-convex optimization problems (like fitting HMMs or Weibulls).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of computing a time-out for a device comprising:
acquiring data comprising a set of inter-arrival times for at least one device over a selected time period;
for each of a set of candidate time-outs, deriving a probability, over the selected time period, that an inter-arrival time from the set of inter-arrival times is greater than the candidate time-out;
with a computer processor, computing a cost function based on the derived probability and a robustness term, the robustness term adding a cost which permits adversarial behavior for a selected fraction of the time; and
identifying a time-out for the at least one device for which the cost function is a minimum.

2. The method of claim 1, wherein the time-out is the time for which the device remains in a first mode, after a job is completed, before moving to a second mode, which consumes less power, in the absence of the arrival of another job.

3. The method of claim 1, wherein cost function is based on at least one of: respective costs of maintaining the at least one device in an idle mode and a sleep mode, a cost of waking the device up from the sleep mode to the idle mode and returning it to the sleep mode, and an annoyance cost associated with a user having to wait for the device to be woken up.

4. The method of claim 3, wherein the annoyance cost is an exponential function of at least one of: a) a time required by the device to transition from the sleep mode to a ready mode; and b) the cumulative time that a group of device users has spent due to sleep mode to ready mode transitions in a selected timeframe.

5. A method of computing a time-out for a device comprising:
acquiring data comprising a set of inter-arrival times for at least one device;
for each of a set of candidate time-outs, deriving a probability that an inter-arrival time from the set of inter-arrival times is greater than the candidate time-out;
with a computer processor, computing a cost function based on the derived probability and a robustness term; and
identifying a time-out for the at least one device for which the cost function is a minimum, the identifying of the time-out for which the cost function is a minimum comprising:
minimizing the cost function:

$$K(s)=(P_{X>s}(s+w)+E[X|X\leq s])+r\ w\ E[X]/s,$$

where s is a candidate timeout period;
$P_{X>s}$ is the probability that an inter-arrival time X is greater than s;

$$w = \frac{(SD + WU)}{(IC - SC)},$$

where SD is the cost associated with changing the device from a first mode to a second mode in which power consumption is lower than in the first mode, WU is the cost associated with changing the device from the second mode to the first mode, IC is the cost per unit time of the device being in the first mode, and SC is the cost per unit time of being in the sleep mode;
$E[X|X\leq s]$ is the mean inter-arrival time when the inter-arrival time is less than s; and
$r\ w\ E[X]/s$ is a robustness term, where r=q/(1-q), where q is a fraction of the time that adversarial behavior not predicted by the data is permitted, and E[X] is the mean inter-arrival time.

6. The method of claim 1, wherein the device comprises a printer and the inter-arrival times comprise inter-print times.

7. The method of claim 5, wherein the device comprises a printer and the inter-arrival times comprise inter-print times.

8. The method of claim 1, further comprising operating the device with the identified time-out.

9. The method of claim 1, further comprising, establishing a maximum timeout which is not to be exceeded.

10. The method of claim 1, wherein the at least one device comprises a plurality of printers and the identified time-out for each of the devices is derived from the same set of inter-arrival times.

11. A method of computing a time-out for a device comprising:
acquiring data comprising a set of inter-arrival times for at least one device;
for each of a set of candidate time-outs, deriving a probability that an inter-arrival time from the set of inter-arrival times is greater than the candidate time-out;
with a computer processor, computing a cost function, based on the derived probability, the cost function including an expected cost term and a robustness term, the expected cost term factoring in an annoyance cost associated with a user having to wait for the device to be woken up, the robustness term accounting for occurrence of adversarial behavior outside the set of acquired inter-arrival times, up to a maximum percentage of the time; and
identifying a time-out for the at least one device for which the cost function is a minimum.

12. The method of claim 11, wherein the maximum percentage is no more than 1%.

13. The method of claim 12, wherein the maximum percentage is no more than 0.5%.

14. The method of claim 1, wherein the acquiring data comprises acquiring inter-arrival times for the at least one device over a period of one week.

15. A printing system comprising a time-out system which performs the method of claim 1 and at least one printer which utilizes the identified time-out.

16. A computer program product, comprising a non-transitory recording medium, encoding instructions which when executed by a computer, cause the computer to perform the method of claim 1.

17. A computer implemented system for computing a time-out for a device comprising:
data memory which stores acquired data comprising a set of inter-arrival times for at least one device;
main memory which stores instructions which, for each of a set of candidate time-outs, derive a probability that an inter-arrival time from the set of inter-arrival times is greater than the candidate time-out, compute a mean inter-arrival time, compute a cost function including an expected cost term and a robustness term, the expected cost term being based on the derived probability, the candidate time-out, and a selected annoyance value, and the robustness term being a function of the computed mean inter-arrival time, and identify a time-out for the at least one device for which the cost function is a minimum; and a processor in communication with the main memory which executes the instructions for processing the acquired data.

18. A printing system comprising the time-out system of claim 17 and at least one printer which provides the acquired data to the time-out system and which receives the identified time-out derived from the acquired data.

19. A printer which includes the timeout system of claim 17.

20. A printing system comprising:
a plurality of networked printers which acquire inter-arrival data for print jobs;
a time-out system which receives the inter-arrival data from the printers, generates at least one histogram therefrom for a set of candidate time-outs, and computes a time-out for the plurality of printers by minimizing a cost function, the cost function summing an expected cost term and a robustness term, the expected cost term including a first term covering the situations where the inter-arrival time is greater than the candidate time-out, and a second term, covering the situations inter-arrival time is less than the candidate time out, the robustness term factoring in adversarial behavior not included in the histogram for a selected fraction of the time.

21. The printing system of claim 20, wherein each of the plurality of printers operates with the same computed time-out.

22. The printing system of claim 20, wherein each printer is assigned its own time-out.

23. The printing system of claim 20, wherein the printers are linked by a network to the time-out system.

24. The method of claim 1, further comprising computing a mean inter-arrival time from the data and wherein the robustness term depends on the mean inter-arrival time.

25. The method of claim 1, wherein the cost function includes an expected cost term and the robustness term, the expected cost term including a first term, based on the derived probability, covering the situations where the inter-arrival time is greater than the candidate time-out, and a second term, covering the situations inter-arrival time is greater than the candidate time out.

26. The method of claim 25, wherein in the first term, the derived probability is multiplied by a sum of the candidate time-out and selected annoyance time.

27. The system of claim 17, where the robustness term is:
$r\ w\ E[X]/s$,
where r is a selected non-zero robustness factor,
w is the selected annoyance value,
$E[X]$ is the mean inter-arrival time,
and s is the candidate time-out.

* * * * *